United States Patent
Aijaz et al.

(10) Patent No.: US 10,972,966 B2
(45) Date of Patent: Apr. 6, 2021

(54) MANAGED FLOODING FOR BLUETOOTH MESH NETWORKS

(71) Applicant: Kabushiki Kaisha Toshiba, Minato-ku (JP)

(72) Inventors: Adnan Aijaz, Bristol (GB); Usman Raza, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/366,591

(22) Filed: Mar. 27, 2019

(65) Prior Publication Data
US 2020/0314735 A1 Oct. 1, 2020

(51) Int. Cl.
| | | |
|---|---|---|
| H04W 48/16 | (2009.01) | |
| H04B 7/14 | (2006.01) | |
| H04W 52/36 | (2009.01) | |
| H04W 4/80 | (2018.01) | |
| H04W 52/34 | (2009.01) | |
| H04W 84/18 | (2009.01) | |

(52) U.S. Cl.
CPC .............. *H04W 48/16* (2013.01); *H04B 7/14* (2013.01); *H04W 4/80* (2018.02); *H04W 52/346* (2013.01); *H04W 52/367* (2013.01); *H04W 84/18* (2013.01)

(58) Field of Classification Search
CPC .... H04W 4/80; H04W 52/346; H04W 52/367
See application file for complete search history.

(56) References Cited

U.S. PATENT DOCUMENTS

| | | | | |
|---|---|---|---|---|
| 10,079,616 B2* | 9/2018 | Reynolds | ............ | H04L 27/2602 |
| 2010/0103850 A1* | 4/2010 | Gossain | ............ | H04W 72/0426 |
| | | | | 370/312 |
| 2012/0328061 A1* | 12/2012 | Chow | ............... | H04W 4/80 |
| | | | | 375/354 |
| 2013/0109313 A1* | 5/2013 | Kneckt | .................. | H04W 4/80 |
| | | | | 455/41.2 |

(Continued)

OTHER PUBLICATIONS

Bluetooth SIG Proprietary, "Mesh Profile," version 1.0, Specification, Jul. 2017, 331 pages.

*Primary Examiner* — Syed Ali
(74) *Attorney, Agent, or Firm* — Oblon, McClelland, Maier & Neustadt, L.L.P.

(57) ABSTRACT

A multi-hop mesh network comprising a plurality of nodes, the plurality of nodes each comprising a receiver, a transmitter, a controller and memory storing program instructions. The plurality of nodes are suitable for participating in data relaying within the network. The plurality of nodes comprise a plurality of source nodes and a plurality of relay nodes. The plurality of source nodes advertise, via the respective transmitter at least one message in one or more advertising events, and adapt the duration of the advertising event. Each advertising event comprises the at least one message being advertised over one or more primary advertising channels. The plurality of relay nodes scan each of the one or more primary advertising channels to receive, via the respective receiver, the at least one message, and relay, via the respective transmitter, the at least one message, and adapt the duration of the scan of the one or more primary advertising channels based on reception of the at least one message during scanning.

10 Claims, 8 Drawing Sheets

(56) References Cited

U.S. PATENT DOCUMENTS

| | | | |
|---|---|---|---|
| 2013/0109314 A1* | 5/2013 | Kneckt | H04W 4/80 455/41.2 |
| 2013/0163491 A1* | 6/2013 | Singh | H04W 52/0216 370/311 |
| 2016/0088424 A1 | 3/2016 | Polo et al. | |
| 2016/0174219 A1* | 6/2016 | Patil | H04W 74/06 370/329 |
| 2017/0161786 A1* | 6/2017 | Terazaki | H04W 8/245 |
| 2018/0160301 A1* | 6/2018 | Kwon | H04W 12/06 |
| 2019/0020439 A1* | 1/2019 | Fawaz | H04K 3/825 |
| 2019/0020741 A1* | 1/2019 | Knaappila | H04W 4/80 |
| 2019/0289453 A1* | 9/2019 | Jang | H04L 47/17 |
| 2020/0275459 A1* | 8/2020 | Skillermark | H04W 72/12 |

\* cited by examiner

MANAGED FLOODING FOR BLUETOOTH MESH NETWORKS

FIELD

Embodiments described herein relate generally to mesh networks and to associated data transmission methods. More specifically, embodiments relate to a flooding technique for use in such networks. Furthermore, embodiments relate to Bluetooth mesh networks.

BACKGROUND

Mesh networking is an attractive solution for enhanced coverage, extended range and improved resilience. It is a key enabler for Internet-of-Things (IoT) in the capillary (short-range) domain. Mesh capabilities have been standardized for various well-known technologies including Wi-Fi and ZigBee. Bluetooth is a well-known short-range connectivity technology which has enjoyed tremendous prosperity over the last decade. Bluetooth mesh (released in July 2017) is the latest addition to the IoT connectivity landscape. The mesh specification provides a full stack connectivity solution for mesh networking in a variety of IoT use-cases and applications across different industrial domains. In a parallel initiative, Bluetooth 5.0 (released in December 2016) specification introduces various new features for enhancing the performance of IoT applications including new physical (PHY) layer designs, enhanced frequency hopping schemes and improved data transmission modes.

Bluetooth mesh provides a simple, efficient and flexible wireless mesh networking solution potentially providing connectivity to thousands of nodes without any coordination. Bluetooth mesh adopts a managed flooding approach that exploits Bluetooth low energy (BLE) advertising mechanism and the presence of multiple relays for message propagation in the mesh network. A message injected in the mesh network is potentially forwarded by multiple relay nodes. The mesh profile builds on broadcasting of data over three Bluetooth low energy (BLE) advertising channels as specified in the Bluetooth core v4.x specification. While this approach provides flexibility in terms of deployment and operation, it has an inherent drawback of congestion on the advertising channels, especially under high traffic load scenarios. This degrades the throughput of the mesh network besides affecting the performance in terms of latency, reliability and scalability. Consequently, existing applications of Bluetooth mesh are limited to monitoring or non-critical control, which are typically found in building automation domain.

Bluetooth mesh provides different techniques for configuring the network such as the use of acknowledged or unacknowledged transmissions, transmission randomization and message repetition schemes. However, such techniques are not sufficient in providing the required quality-of-service for real-time or near real-time control applications. On the other hand, most Bluetooth-based proprietary protocols designed for control applications are not directly compatible with the Bluetooth mesh specification.

BRIEF DESCRIPTION OF THE DRAWINGS

In the following, embodiments will be described with reference to the drawings in which.

DETAILED DESCRIPTION

Figure 1:
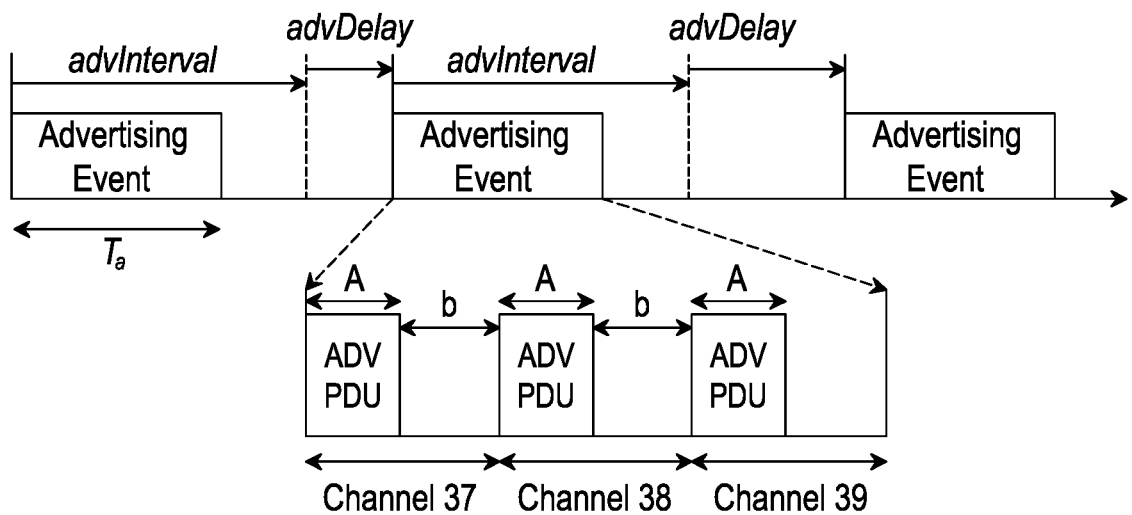
FIG. 1 provides a representation of an advertising process in a Bluetooth mesh network.

In an embodiment there is provided a multi-hop mesh network comprising a plurality of nodes. The plurality of nodes each comprising a receiver, a transmitter, a controller and memory storing program instructions, the plurality of nodes suitable for participating in data relaying within the network. The plurality of nodes comprising a plurality of source nodes and a plurality of relay nodes. The respective program instructions of each of the plurality of source nodes causing the respective controller, when executed by the respective controller, to: advertise, via the respective transmitter, at least one message in one or more advertising events, wherein each advertising event comprises the at least one message being advertised over one or more primary advertising channels; and adapt the duration of the advertising event. The respective program instructions of each of the plurality of relay nodes causing the respective controller, when executed by the respective controller, to: scan each of the one or more primary advertising channels to receive, via the respective receiver, the at least one message, relay, via the respective transmitter, the at least one message, and adapt the duration of the scan of the one or more primary advertising channels.

In an embodiment, the respective program instructions of the plurality of source nodes further causing the respective controller, when executed by the respective controller, to advertise a pointer to a secondary channel in the advertising event, and the respective program instructions of the plurality of relay nodes further causing the respective controller, when executed by the respective controller, to switch to the secondary channel after receiving the pointer to the secondary channel.

In an embodiment, the respective program instructions of the plurality of nodes further causing the respective controller, when executed by the respective controller, to adapt a transmit power over each channel in the advertising event.

In an embodiment, the respective program instructions of the plurality of relay nodes further causing the respective controller, when executed by the respective controller, to mix a plurality of the messages received during a scan of one of the plurality of advertisement events, and relay a linear combination of the plurality of the messages over one or more primary advertising channels or a different channel.

In an embodiment, the respective program instructions of the plurality of relay nodes further causing the respective controller, when executed by the respective controller, to decide whether or not to switch to a secondary channel for receiving the message after receiving a pointer to the secondary channel from a source node based on information received on the one or more primary advertising channels and/or based on data to be sent over the secondary channel.

In an embodiment, the network is one of a Bluetooth mesh network, a mesh network based on IEEE 802.15.4, and a Wi-Fi mesh network.

In an embodiment, there is provided a source node comprising a receiver, a transmitter, a controller and memory storing program instructions. The source node for use in a multi-hop mesh network. The program instructions causing the controller, when executed by the controller, to: advertise, via the transmitter, at least one message in one or more advertising events, wherein each advertising event comprises the at least one message being advertised over one or more primary advertising channels, and adapt the duration of the one or more advertising events.

In an embodiment, the duration of the one or more advertising events is adapted based on the source node finding the at least one message being relayed in the network.

In an embodiment, the program instructions further causing the controller, when executed by the controller, to enter a fast advertising mode having a fast advertising event, which has a reduced duration with respect to the advertising event, when the source node finds the at least one message being relayed in the network on any of the one or more primary advertising channels after a plurality of advertising events.

In an embodiment, the program instructions further causing the controller, when executed by the controller, to at least one of: reduce the duration of the fast advertising event, in the fast advertising mode, with respect to the duration of the advertising event by reducing a duration b to a first fast channel switching time c; and increase the duration of the fast advertising event, in the fast advertising mode, by increasing the first fast channel switching time c to a second fast channel switching time c' if the source node does not find the at least one message being relayed in the network on any of the plurality of primary advertising channels after a plurality of advertising events.

In an embodiment, the program instructions further causing the controller, when executed by the controller, to repeat the increase in the duration of the fast advertising event, in the fast advertising mode, until a predetermined duration of the advertising event is reached.

In an embodiment, the program instructions further causing the controller, when executed by the controller, to advertise a pointer to a secondary channel in the advertising event.

In an embodiment, the program instructions further causing the controller, when executed by the controller, to adapt a transmit power over the one or more primary advertising channels in the advertising event.

In an embodiment, there is provided a relay node comprising a receiver, a transmitter, a controller and memory storing program instructions. The relay node for use for use in a multi-hop mesh network. The program instructions causing the controller, when executed by the controller, to: scan one or more primary advertising channels to receive, via the receiver, at least one message, wherein the one or more primary advertising channels are used to advertise the at least one message in one or more advertising events, and relay, via the transmitter, the at least one message, and to adapt the duration of the scan of the one or more primary advertising channels.

In an embodiment, the program instructions further causing the controller, when executed by the controller, to reduce the duration of the scan of each of the one or more primary advertising channels.

In an embodiment, the program instructions further causing the controller, when executed by the controller, to at least one of: reduce the duration of the scan of each of the one or more primary advertising channels, and to reduce the duration of the scan of each of the one or more primary advertising channels to a minimum required for receiving the at least one message from the source node operating in fast advertising mode.

In an embodiment, the program instructions further causing the controller, when executed by the controller, to increase the duration of the scan if the relay node does not receive the at least one message over one or a plurality of advertising events.

In an embodiment, the program instructions further causing the controller, when executed by the controller, to repeat the increase in the duration of the scan until a predetermined duration of the scan is reached.

In an embodiment, the program instructions further causing the controller, when executed by the controller, to maintain the duration of the scan for a predetermined number of advertising events if the at least one message has been received.

In an embodiment, the program instructions further causing the controller, when executed by the controller, to mix a plurality of the messages received during a scan of one of the plurality of advertisement events, and relay a linear combination of the plurality of the messages over one or more primary advertising channels or a different channel.

In an embodiment, the program instructions further causing the controller, when executed by the controller, to decode the linear combination of the plurality of the messages to recover the plurality of the messages.

In an embodiment, the program instructions further causing the controller, when executed by the controller, to adapt a transmit power over each channel relaying the at least one message from the relay node.

In an embodiment, there is provided a relay node comprising a receiver, a transmitter, a controller and memory storing program instructions. The relay node for use for use in a multi-hop mesh network. The program instructions causing the controller, when executed by the controller, to: scan one or more primary advertising channels to receive, via the receiver, at least one message, wherein the one or more primary advertising channels are used to advertise the at least one message in one or more advertising events, and relay, via the transmitter, the at least one message, and to decide whether or not to switch to a secondary channel for receiving the message after receiving a pointer to the secondary channel from a source node based on information received on the one or more primary advertising channels and/or based on data to be sent over the secondary channel.

In an embodiment, the program instructions further causing the controller, when executed by the controller, to decide to switch to the secondary channel with a probability only if the data to be sent over the secondary channel is new and/or it is the first advertising event for the source node, or a probability based on the number of times a data packet was received during a window of scanning events.

In an embodiment, there is provided a node comprising a receiver, a transmitter, a controller and memory storing program instructions. The node for use for use in a multi-hop mesh network. The program instructions causing the controller, when executed by the controller, to adapt a transmit power over each channel in an advertising event.

In an embodiment, the program instructions of the node further causing the controller, when executed by the controller, to adapt the transmit power based on the received power from a plurality of neighbouring nodes on all channels and a threshold sensitivity of the receiver.

In an embodiment, the program instructions of the node further causing the controller, when executed by the controller, to find a minimum received power from any of the plurality of neighbouring nodes on each channel, calculate the respective transmit power on each channel based on the minimum received power, and use the respective transmit power on each channel.

In an embodiment, there is provided a method of data relaying in a multi-hop network of nodes comprising a plurality of source nodes, and a plurality of relay nodes, the method comprising advertising at least one message from at least one of the plurality of source nodes in one or more advertising events, wherein each advertising event comprises the at least one message being advertised over one or more primary advertising channels; adapting the duration of the advertising event; scanning each of the one or more primary advertising channels to receive the at least one message at at least one of the plurality of relay nodes, relaying the at least one message at the at least one of the plurality of relay nodes, and adapting the duration of the scan of the one or more primary advertising channels.

In an embodiment, there is provided a method of data relaying in a multi-hop network of nodes comprising, within a node: advertising at least one message in one or more advertising events, wherein each advertising event comprises the at least one message being advertised over one or more primary advertising channels, and adapting the duration of the advertising event.

In an embodiment, there is provided a method of data relaying in a multi-hop network of nodes comprising, within a node: scanning one or more primary advertising channels to receive, via the receiver, at least one message, wherein the one or more primary advertising channels are used to advertise the at least one message in one or more advertising events, and relaying, via the transmitter, the at least one message, and adapting the duration of the scan of the one or more primary advertising channels.

In an embodiment, there is provided a method of data relaying in a multi-hop network of nodes comprising, within a node: scanning one or more primary advertising channels to receive, via the receiver, at least one message, wherein the one or more primary advertising channels are used to advertise the at least one message in one or more advertising events, and relaying, via the transmitter, the at least one message, and deciding whether or not to switch to a secondary channel for receiving the message after receiving a pointer to the secondary channel from a source node based on information received on the one or more primary advertising channels and/or based on data to be sent over the secondary channel.

In an embodiment, there is provided a method of data relaying in a multi-hop network of nodes comprising, within a node: adapting a transmit power over each channel in an advertising event. Each channel may be one or more primary advertising channels used to advertise at least one message in one or more advertising events.

In an embodiment, there is provided a non-transitory storage medium comprising computer program instructions, the computer program instructions, when executed by a processor, configured to cause the processor to perform the methods described above.

Embodiments described herein provide enhancements to Bluetooth mesh technology while ensuring standard compatibility with Bluetooth mesh profile v1.0 (which is based on Bluetooth core v4.0 specification) and upcoming mesh profiles (which are expected to be based on Bluetooth v5.0). The proposed enhancements are centred on improving the managed flooding approach for Bluetooth mesh networks.

Embodiments improve the performance of standard Bluetooth mesh in terms of at least one of four key performance indicators (KPIs): (i) latency, (ii) reliability, (iii) throughput, and (iv) scalability.

Embodiments result in higher throughput and scalability for the Bluetooth mesh network.

Embodiments improve the latency and reliability of Bluetooth mesh and make it more suitable for control-centric industrial applications. Embodiments enhance the scalability and throughput of Bluetooth mesh network which enables a large number of devices to communicate effectively within relatively shorter latency constraints. Embodiments enable co-existence of Bluetooth 4.x and Bluetooth 5 devices in a mesh network. Certain embodiments of the proposed scheme also improve the energy efficiency of a mesh network.

Structural features of the embodiments include at least one of:

a) Adaptive Advertising and Scanning—Embodiments implement techniques for adapting the duration of advertising and scanning periods.

b) Power-controlled Advertisements—Embodiments implement a power control technique for data transmission over advertising channels. This may result in higher throughput and scalability for the Bluetooth mesh network.

c) Network-coded Advertisements—Relay nodes exploit adaptive scanning and implement a random linear network coding (RLNC) technique for efficient relaying of data from multiple sources.

d) Mode Selection—Relay nodes implement a mode selection strategy to minimize the probability of missing packets on advertising channels.

In embodiments described herein, a multi-hop wireless mesh network is described. Connectivity is provided between multiple nodes which can be characterized as controllers, sensors or actuators.

In embodiments described herein, there are:

1. A co-existence scenario where both Bluetooth 4.x and Bluetooth 5.0 devices co-exist;

2. 40 different frequency channels with a bandwidth of 2 MHz each;

3. Bluetooth 4.x devices transmitting at the 1 Mbps uncoded PHY layer; and

4. Bluetooth 5.0 transmitting at 1 Mbps or 2 Mbps uncoded PHY layers or 125/500 kbps coded PHY layers.

The Bluetooth mesh architecture is based on seven different protocol layers on top of the Bluetooth 4.x core specification. These are known as the bearer layer, the network layer, the lower transport layer, the upper transport layer, the access layer, the foundation model layer and the model layer. Each layer has its own functions and provides services to the layer above it.

Embodiments are focused on the bearer and network layers. The bearer layer defines how messages are transported between nodes. Currently, two bearers have been defined: advertising bearer and GATT bearer. The former is the default bearer for message propagation in the mesh network based on a managed flooding approach. The latter allows a device which does not support the advertising bearer to communicate indirectly with a mesh network using a proxy protocol.

The network layer defines the format of transport messages to be transported by the bearer layer. It also handles the implementation of different node features. All nodes in a mesh network may transmit and receive messages. Nodes in the legacy Bluetooth mesh network may support the relay feature which allows a node to receive and retransmit mesh messages over the advertising bearer. It will be understood that references in the description to re-transmitting may be considered to be relaying, i.e. this is not a new transmission from a source node.

FIG. 1 illustrates an advertising process in a Bluetooth mesh network. The mesh profile builds on broadcasting of data over three BLE advertising channels. A source node injects its message into the mesh network through the advertising process which entails transmitting messages in three advertising channels (e.g. index=37, 38, 39). An advertising event is defined as a cycle of advertising operations where mesh protocol data units (PDUs) are sent in sequence over each of the three advertising channels.

The network layer may configure multiple advertising events to improve the reliability of message injection into the mesh network. The duration between two consecutive advertising events is variable in nature and consists of a fixed advInterval and a pseudo-random advDelay. The relay nodes in the mesh network periodically scan the advertising channels and listen to the advertising information of the neighbouring nodes.

Figure 2:
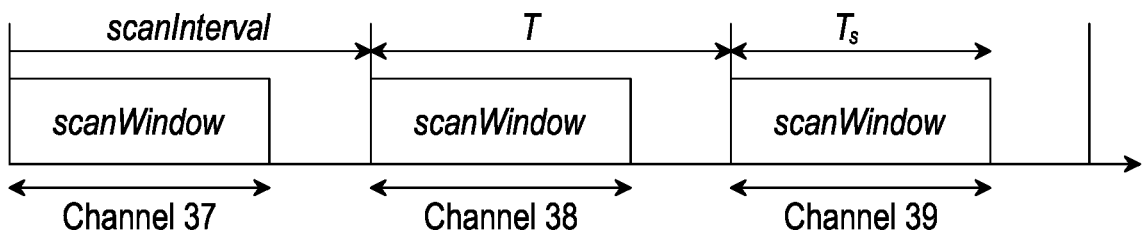
FIG. 2 provides a representation of a scanning process in a Bluetooth mesh network.

As illustrated in FIG. 2, a relay node scans a different advertising channel (e.g. channel 37, 38 or 39) every scanInterval for a duration of scan Window. The initial advertising channel to scan on is selected randomly (from the three advertising channels) and all channels are scanned periodically. Multiple relay nodes scanning on different advertising channels increase the probability of message propagation in the mesh network.

The contention-based nature of advertising channels is prone to congestion, particularly under high traffic load, potentially leading to degradation in throughput and other metrics including latency and reliability. To circumvent this issue, the network layer supports restrictions to relaying of messages. Each node maintains a cache of previously relayed messages and relaying is restricted to the messages not present in the cache. Another technique is to limit the forwarding of messages based on the time to live (TTL) value which is decremented every time a message is relayed. By default, relay nodes only forward a message with TTL value greater than one.

Figure 3:
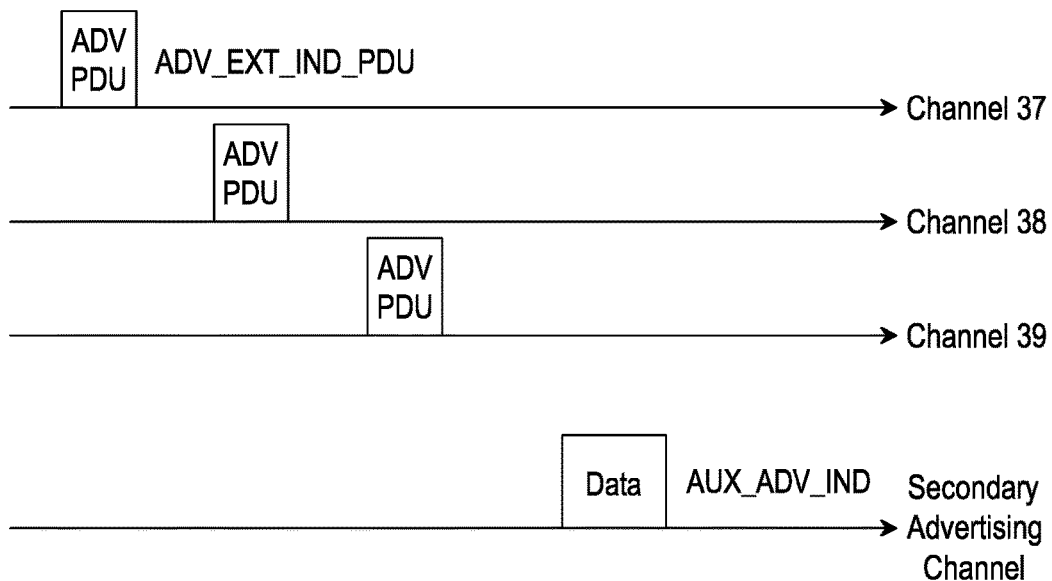
FIG. 3 provides a representation of an extended advertisement mode of Bluetooth 5.0.

FIG. 3 illustrates an extended advertising mode (also referred to as advertising extensions). This has been introduced in Bluetooth 5.0, which exploits additional channels for data transmission.

With advertising extensions, a node sends short extended advertising indications (i.e. ADV_EXT_IND_PDU) in the three legacy advertising channels, also known as primary advertising channels. The extended advertising indication includes a pointer to a secondary advertising channel which is chosen from the remaining 37 channels. The scanner (e.g. the relay node scanning the advertising channels) may switch to the secondary advertising channel to receive the data payload. The data payload is sent in an auxiliary advertisement packet (i.e. AUX_ADV_IND) sent over the secondary advertising channel after the advertising event on the primary advertising channels is finished. The data payload sent over the secondary advertising channel is the actual data that needs to be transmitted. The transmissions on the primary advertising channels only include a pointer to the channel on which this data transmission would take place.

Extended advertisements provide a way to advertise more data than that allowed on the legacy advertisements. Another feature of advertising extensions is periodic advertisements which are used for broadcasting packets to nodes at a fixed interval. More than one node can listen to periodic advertisements. The data transmitted over the secondary advertising channel contains necessary information for the scanner to synchronize with the advertiser.

Adaptive Advertising and Scanning

Embodiments include adaptation of advertising and scanning durations for source and relay nodes in a mesh network. The adaptation of advertising and scanning durations is done in tandem. This may enable successful operation of the mesh network in high traffic loads. This is achieved through minimizing the crowding of advertising channels and maximizing the availability of relay nodes.

Figure 4:
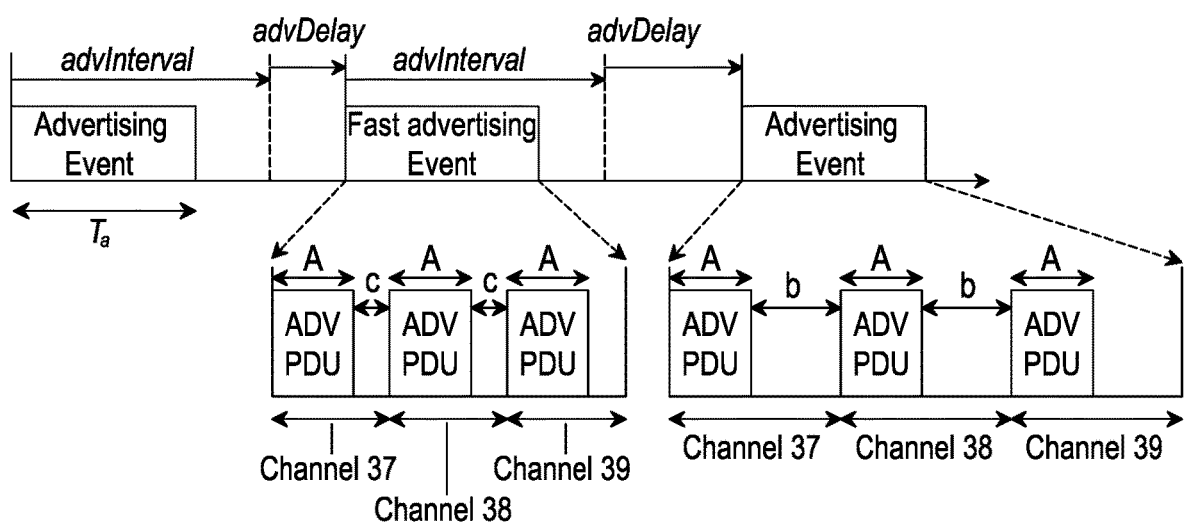
FIG. 4 provides a representation of adaptive advertising in a Bluetooth mesh network according to an embodiment.

FIG. 4 illustrates an embodiment of an adaptive advertising procedure. Typically, in a mesh network a source node injects its message in the mesh network through multiple advertising events which are configured by the network layer. Embodiments exploit this configuration by introducing a fast advertising mode (e.g. in a Bluetooth mesh network) which adapts the duration of the advertising event for a given duration of advInterval. Each advertising event has at least one message being advertised sequentially over three channels (primary advertising channels). In this embodiment, the primary advertising channels are Channels 37, 38 and 39. In embodiments, such as those using the Bluetooth mesh specification, the number of advertising channels is limited to three channels only. However, the proposed technique is not limited by the number of channels. Thus, in other embodiments, there may be more or less than 3 primary advertising channels. It will be appreciated that through this description, any mention to 3 primary advertising channels is only an example, and other number of advertising channels may be used.

Figure 5:
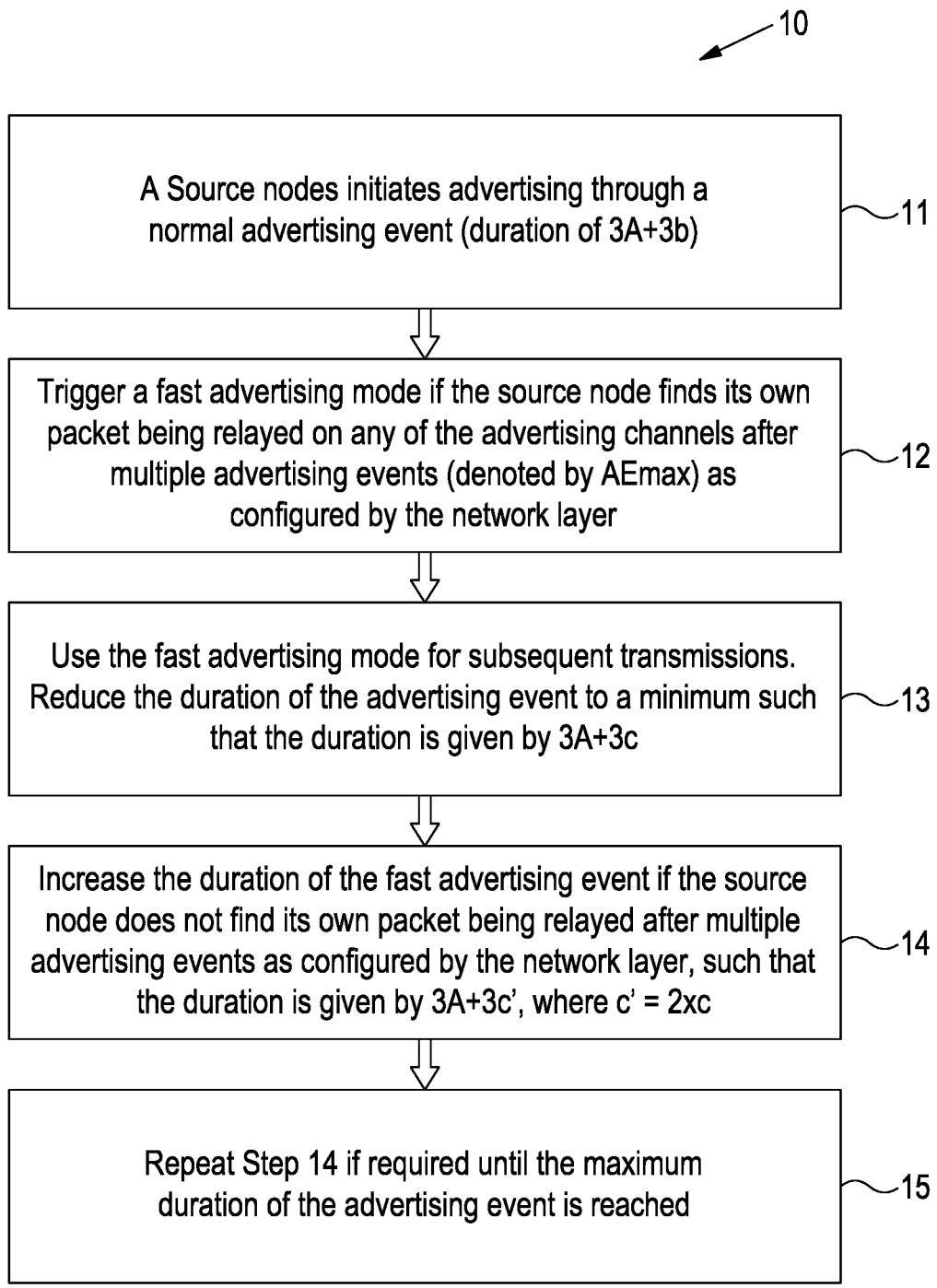
FIG. 5 is a flow diagram of an adaptive advertising data transmission method of an embodiment.

FIG. 5 shows a method 10 of an embodiment having steps 11-15 as described.

Step 11: A source nodes initiates advertising through a normal advertising event which spans a duration of 3A+3b. The number '3' is the number of primary advertising channels. 'A' is a constant depending on size of the protocol data unit and 'b' is a fixed duration (much larger than the channel switching time).

Step 12: A fast advertising mode is triggered if the source node finds (i.e. by listening on the advertising channels, when not engaged in transmission) its own packet being relayed on any of the advertising channels after multiple advertising events (denoted by AEmax) as configured by the network layer. AEmax may be fixed by the standard. The source node finding its own packet being relayed provides feedback to the source node that reducing the duration of the advertising mode is not detrimental to the transmission of its data packets. In other embodiments, there may be other triggers for entering the fast advertising mode. In other embodiments, the number of fast advertising events among the total number of advertising events, dictated by AEmax, can be fixed.

Step 13: The fast advertising mode is used for subsequent transmissions by a source node. In the fast advertising mode, a source node reduces the duration of the advertising event to the minimum such that the duration is given by 3A+3c, where c is the channel switching time, i.e. the channel switching time c is less than the fixed duration b. A is fixed as the size of the packet stays the same. A+c is the quickest a packet can be transmitted over a single channel. The number of fast advertising events may be less than or equal to AEmax.

Step 14: A source node increases the duration of the fast advertising event, if it does not find its own packet being relayed after multiple advertising events as configured by the network layer, such that the duration is given by 3A+3c', where c'=2×c.

Step 15: Repeat Step 14 if required (i.e. if the source node does not find its own packet being relayed after multiple advertising events) until the maximum duration of the advertising event is reached. The maximum duration may be fixed based on the standard or a pre-defined threshold.

Unlike the source node, a relay node transmits the packet in a single advertising event. A fast advertising mode is triggered only if the relay node received the packet while operating in an adaptive scanning mode which is described below. The relay node operates in fast advertising mode only if it received a packet during fast scanning mode. The standard Bluetooth mesh only allows relay nodes to have one advertising event. However, in other embodiments, the relay node may have more than one advertising event.

Figure 6:
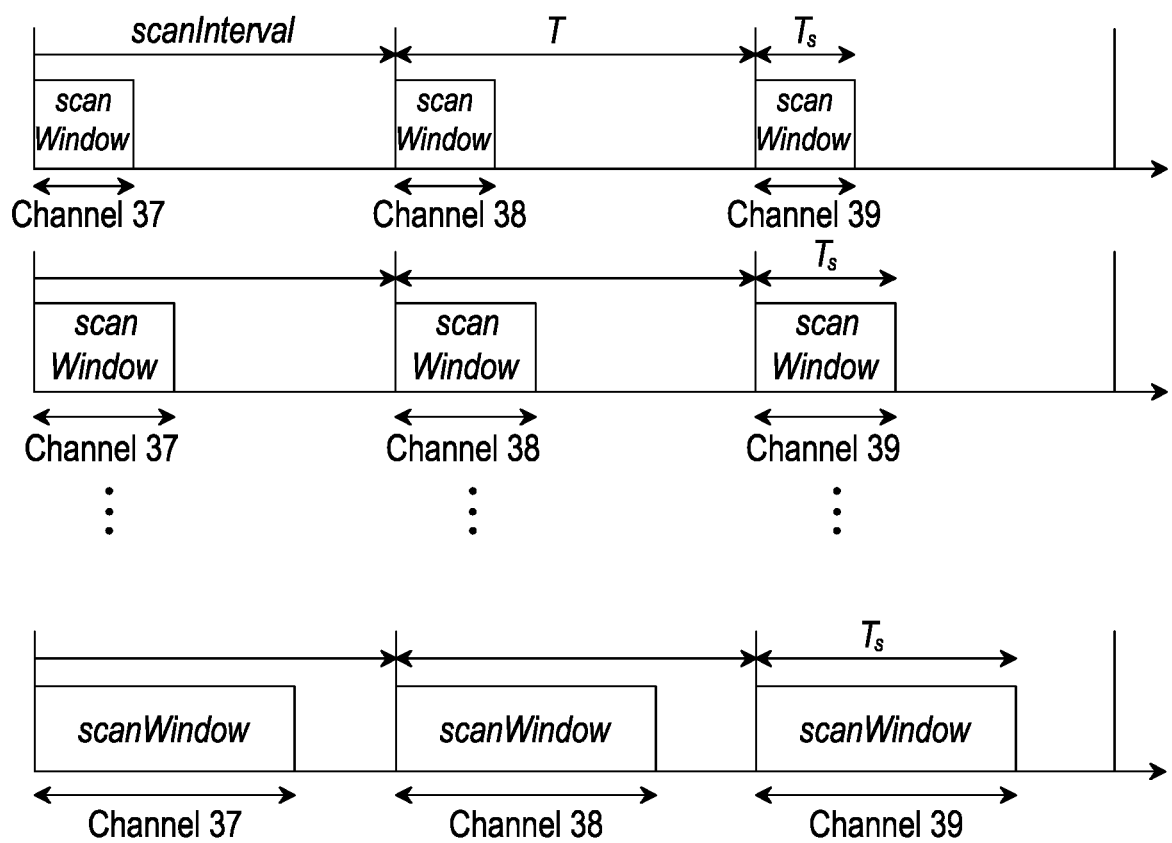
FIG. 6 provides a representation of adaptive scanning in a Bluetooth mesh network according to an embodiment.

FIG. 6 illustrates an embodiment of an adaptive scanning procedure. Typically, in a mesh network, a relay node scans advertising channels for potential messages to be relayed. The initial channel is selected randomly and all channels are scanned until a message is received. In embodiments, relay nodes adapt the duration of scanWindow for a given duration of scanInterval.

Figure 7:
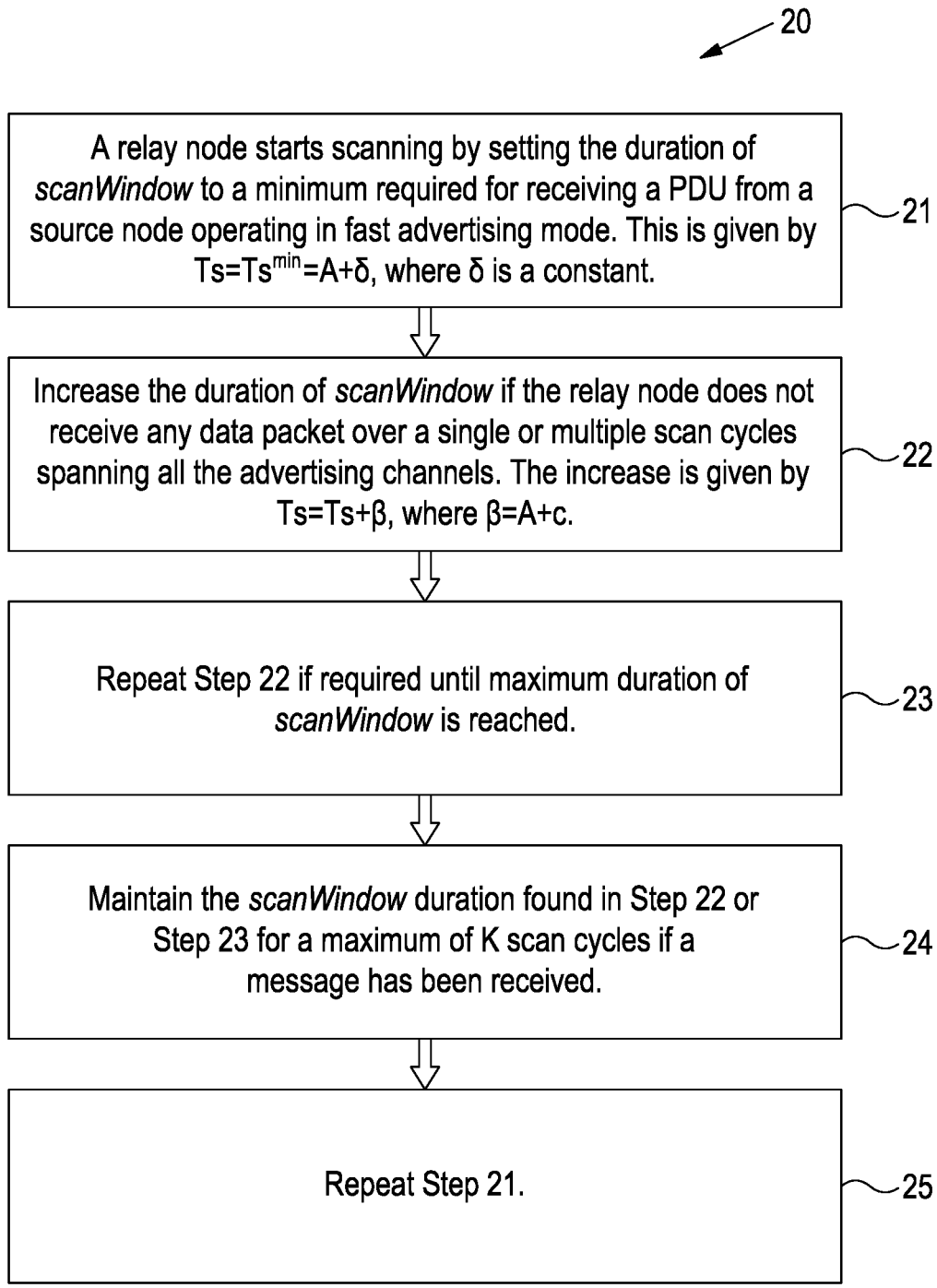
FIG. 7 is a flow diagram of an adaptive scanning data transmission method of an embodiment.

FIG. 7 shows a method 20 of an embodiment having steps 21-25 as described.

Step 21: A relay node starts scanning by setting the duration of scanWindow to a minimum required for receiving a PDU from a source node operating in fast advertising mode. This is given by $Ts=Ts^{min}=A+\delta$, where $\delta$ is a constant. $\delta$ is a relatively small duration (less than the channel switching time) to ensure a relay node receives the PDU during a minimal scan window.

Step 22: A relay node increases the duration of scanWindow if it does not receive any data packet (e.g. PDU) over a single or multiple scan cycles spanning all the advertising channels. The increase is given by $Ts=Ts+\beta$, where $\beta=A+c$. A and c are fixed and known. More generally, the increase may be in discrete steps.

Step 23: Repeat Step 22 if required (i.e. if the relay node does not receive any data packet over a single or multiple scan cycles) until maximum duration of scan Window is reached. The maximum duration is based on a standard or a pre-defined threshold.

Step 24: Maintain the scanWindow duration found in Step 22 or Step 23 for a maximum of K scan cycles if a message has been received. The number (K) of scan cycles is an implementation detail.

Step 25: Repeat Step 21.

Power-Controlled Advertisements

In some embodiments, the throughput as well as the scalability of the Bluetooth mesh network may be improved. This may be achieved through power-controlled advertisements.

Figure 8:
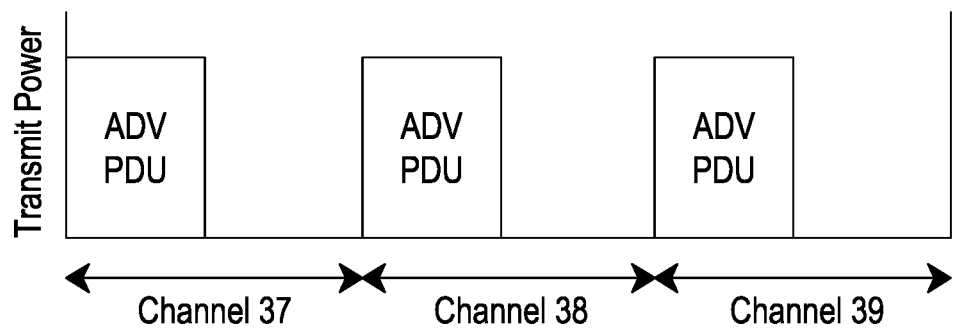
FIG. 8 provides a representation of power-controlled advertisements in a Bluetooth mesh network according to an embodiment.
Figure 8:
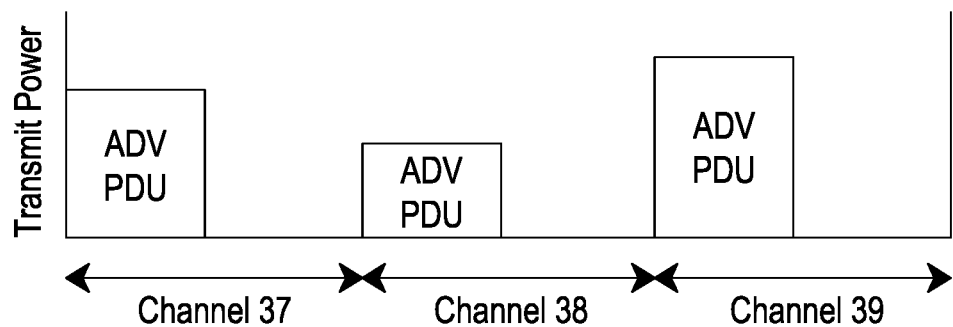

FIG. 8 illustrates Power control, which may provide two benefits for the Bluetooth mesh network. Firstly, it reduces interference to other sources nodes in the network which potentially enables multiple transmissions at the same time. Secondly, it ensures better availability of relay nodes for forwarding messages from different source nodes. A reduced power implies a reduced transmission range. Therefore, using the reduced power for a particular source node may mean that some of the relay nodes are out of range of the transmission of the source node, with these relay nodes becoming available for other source nodes. In some embodiments, an optimised power control strategy is implemented that ensures higher throughput and scalability without compromising communication reliability.

In a Bluetooth mesh network, relay nodes scan advertising channels for potential messages that need to be forwarded. However, source nodes can also scan the advertising channels to receive implicit acknowledgement for successful forwarding of the transmitted message by relay nodes.

In embodiments, the power control strategy is based on received signal strength and applicable to both source and relay nodes. Thus, the power control strategy is based on received power and the sensitivity of the receiver of the source or relay nodes. The number of advertising events may be different at source and relay nodes. However, within an advertising event, a node (source/relay) advertises data over the advertising channels (which may number 3 or more). The sensitivity of the source or relay nodes may have a threshold. The received power at a node j, based on a transmission from node i at maximum transmit power Pmax is given by $$Prx = Pmax \times g \times d^{-a}, \qquad \text{Equation (1)}$$

where g is the channel power gain, d is the distance and a is the path loss exponent. The controlled power is determined by $$Pc = Pmax \times (Prx)^{-1} \times \Delta \times f, \qquad \text{Equation (2)}$$

where $\Delta$ denotes the minimum required received signal strength and f is a constant. $\Delta$ is dependent on the hardware/chipset. $\Delta$ may also be called 'receiver sensitivity'. The constant f depends and varies with operating environment and is set at design time.

The nodes in a Bluetooth mesh network implement the power control strategy as follows. In order to implement power control, nodes maintain some neighbourhood information of the received power from different neighbouring nodes. Neighbouring nodes may be defined as all the nodes that can be heard in the neighbourhood or all the nodes within one-hop neighbourhood of each other. A node may only implement power control if it has overheard messages on all the advertising channels.

Figure 9:
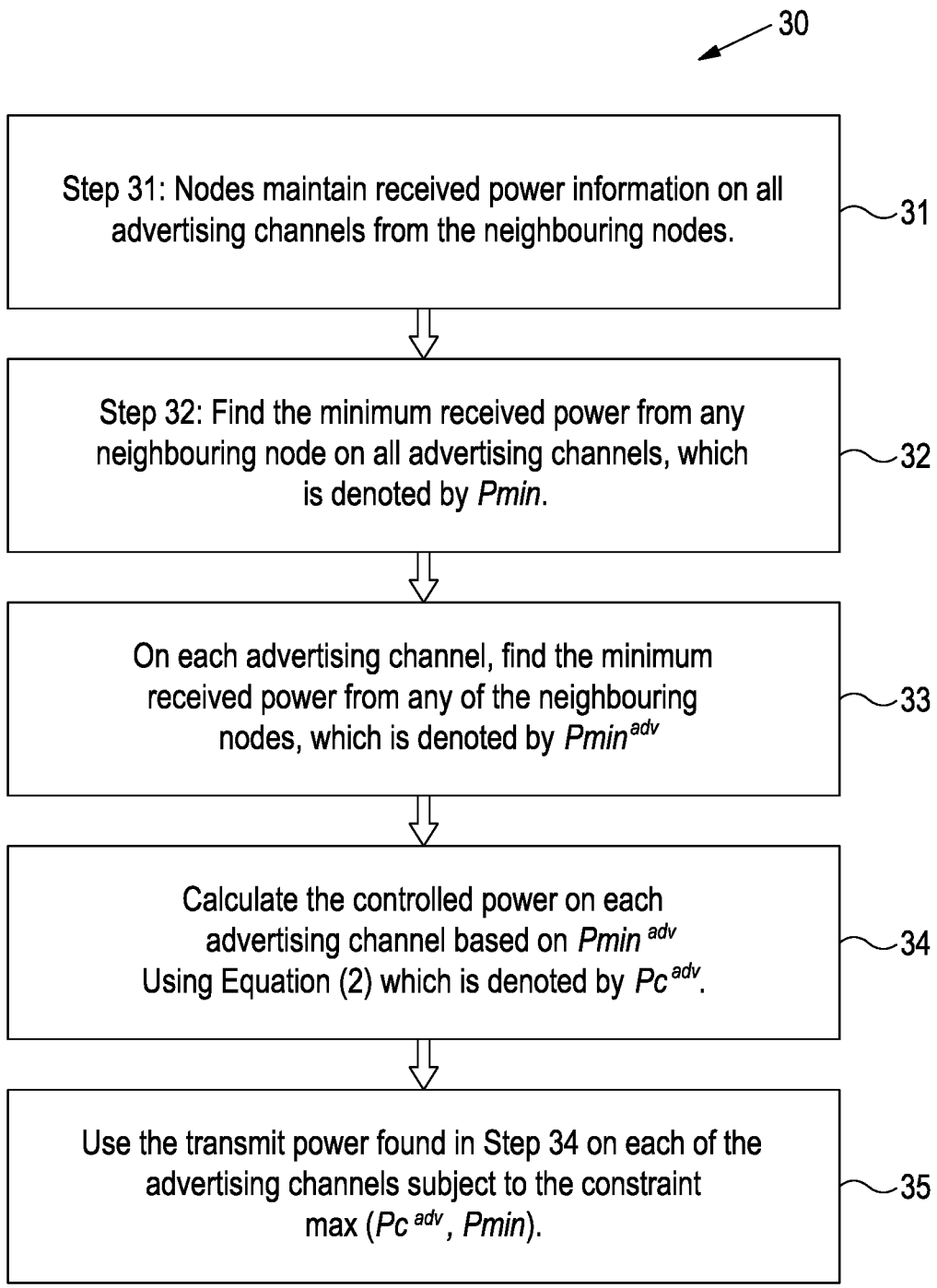
FIG. 9 is a flow diagram of a power-controlled advertisements data transmission method of an embodiment.

FIG. 9 shows a method 30 of an embodiment having steps 31-35 of power-controlled advertisements as described.

Step 31: Nodes maintain received power information on all advertising channels from the neighbouring nodes.

Step 32: Find the minimum received power from any neighbouring node on all advertising channels which is denoted by Pmin.

Step 33: On each advertising channel, find the minimum received power from any of the neighbouring nodes, which is denoted by $Pmin^{adv}$.

Step 34: Calculate the controlled power (denoted by $Pc^{adv}$) on each advertising channel based on $Pmin^{adv}$ using Equation (2), ($Pmin^{adv}$ is used as Prx).

Step 35: Use the controlled power (new transmit power) found in Step 34 on each of the advertising channels subject to the constraint max ($Pc^{adv}$, Pmin).

Exemplary transmit powers of the three channels 37, 38 and 39 are shown in FIG. 8. It may be seen in this embodiment that channel 38 has a transmit power less than Channel 37 and Channel 39 has a transmit power greater than Channel 37.

The proposed power control scheme may be made more aggressive (i.e. more nodes excluded from network) by adding a small tolerance margin to Pmin. This is particularly attractive for dense deployments. In one embodiment, the proposed power control scheme is only used by the source nodes in the mesh network.

In another embodiment, source and relay nodes in the mesh network broadcast the transmit power information by embedding the power level information in the header of the packet being advertised on the advertising channels. In this case, the power control scheme is used by any node (source or relay) in the mesh network. Nodes adapt their transmit power using the aforementioned power control scheme and replace Pmax with the transmit power information of the respective neighbouring node.

Network-Coded Advertisements

In embodiments, the relay nodes exploit adaptive advertisements and implement a random linear network coding (RLNC) technique, also known as simple network coding (SNC), for efficient relaying of data from multiple sources. Embodiments mix distinct received messages from different source nodes and send a linear combination to simultaneously disseminate these in the mesh network. Benefits of network-coded advertisements include reduction in end-to-end latency, improvement in resource utilisation and enhancement of throughput.

In embodiments, relay nodes either operate in legacy mode or network-coded mode. In the former case, a relay node goes into advertising mode after receiving a packet on any advertising channel. In the network-coded mode, a relay node completes its cycle of scanning the advertising channels before going into the advertising mode. The relay node sends a coded advertisement only if it has received multiple messages during the scan cycle. Network-coded advertisements may be realised in the legacy mode as well. For instance, a relay node can cache a previously received message and encode it with a new message which has been received after the advertising of the previously received message. However, this approach has an inherent drawback of injecting additional traffic into the mesh network.

Figure 10:
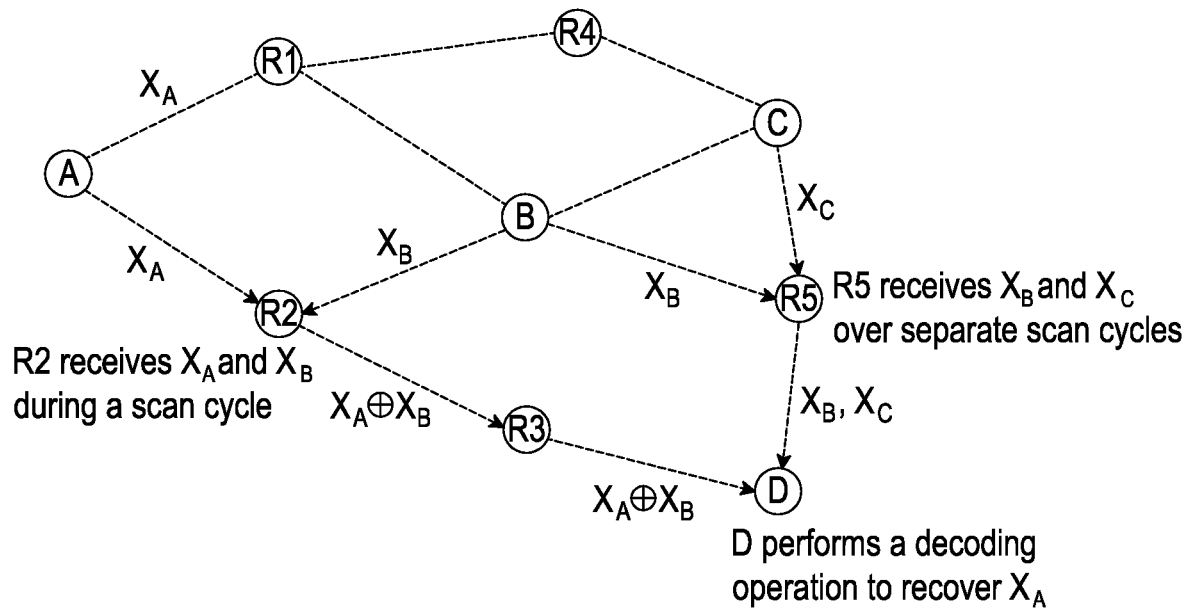
FIG. 10 provides a representation of network-coded advertisements in a Bluetooth mesh network according to an embodiment.

FIG. 10 illustrates the operation of network-coded advertisements. The scenario depicts a mesh network wherein source nodes A, B and C need to send their messages to a destination node D.

Initially, both node A and node B advertise their messages on the advertising channels. In this scenario, node A's transmission ($X_A$) was successful only with relay R2, which is operating in the network-coded mode. Further, relay R2 successfully receives the message ($X_B$) from node B during the scan cycle. That is, relay R2 receives messages $X_A$ and $X_B$ during the scan cycle. Therefore, relay R2 encodes transmissions of node A and node B and advertises the coded message on the advertising channels, which is successfully received by relay R3. That is, messages $X_A$ and $X_B$ are sent together as a coded message $X_A+X_B$ to relay R3.

The transmission ($X_B$) from node B was also successfully received by relay R5. Following node B's transmissions, node C also advertises its message ($X_C$) on the advertising channel used in the advertising event. In this scenario, relay R5 does not receive the information from node C during the scan cycle. Therefore, relay R5 advertises node B's message ($X_B$), which is then received by the destination node D. Node C's message ($X_C$) is received by relay R5 in a different scan cycle from the scan cycle in which relay R5 received node B's message ($X_B$). With further advertising and scanning events, node D receives the encoded message from relay R3 and node C's message from relay R5. Therefore, relay R5 performs a decoding operation to recover the message ($X_A$) from node A.

In order to reconstruct messages, a destination node needs to know which source nodes have been combined in a received message. This information can be embedded into any of the reserved fields of the MAC frame. This approach provides backward compatibility as the network coding operation would be transparent to a relay node operating in the legacy mode.

It may also be important to distinguish encoded messages. This can be achieved through a (minimum) 1-bit change in the MAC frame header. A relay node may receive up to three distinct messages in a single scan cycle. Hence, the maximum number of messages that can be encoded is limited to 3.

It is also likely that a relay node receives an already encoded message and an uncoded message during the scan cycle. In this case, the relay node can encode both messages.

Network-Coded Extended Advertisements

The network coding mode and the extended advertising mode are complementary to each other. For example, a Bluetooth 5 relay node, operating in the network-coded mode, may go into an extended advertising mode to transmit the encoded message. This may potentially increase the reliability of the encoded message. This is because the data transmission in extended advertisements takes place on a new channel (which is different from the 3 advertising channels), which is less crowded and, therefore, less likely to fail due to interference.

On the other hand, a Bluetooth 5 relay node may receive a message from a Bluetooth 4 source/relay node as well as an extended advertising message (ADV_EXT_IND_PDU) during the scan cycle. In this case, the relay node can switch to the secondary advertising channel to receive the new message which is encoded with the one received from the Bluetooth 2 source/relay node during the scan cycle. The encoded message is advertised in a separate advertising event.

Mode Selection

The legacy advertising mode has an inherent drawback of creating congestion on the legacy advertising channels, especially under high traffic load scenarios. The extended advertising mode may overcome the congestion issue; however, it suffers from reduced effective scanner duty cycle on the legacy advertising channels. This is because relay nodes are not scanning the primary advertising channels as frequently. In embodiments, relay nodes (which are capable of listening to both legacy and extended advertisements) implement a mode selection strategy that dictates on-the-fly mode selection between the legacy and the extended advertising modes.

The mode selection strategy may be applied in two different scenarios. In the first scenario, a relay node is operating in the legacy scanning mode, i.e., there is no adaptation of the scanning duration. A relay node may receive an extended advertising packet (ADV_EXT_IND_PDU) during scanning of primary advertising channels. The relay node makes a decision to switch to the secondary advertising channel with a probability Prob_AE only if the auxiliary packet contains new data and it's the first advertising event in case of a source node. A source node has multiple opportunities of transmission depending on the advertising events. If it is not the first advertising event for that source node, there is a possibility that another relay node might have forwarded the auxiliary packet already. This information can be embedded into the Adv_Data_Info (ADI) field which has been introduced in Bluetooth 5.

In the second scenario, a relay node is operating in the adaptive scanning mode. In this case, it may receive multiple packets during one scan cycle. It makes a decision to switch to the secondary advertising channel with a probability 1−Prob_LA, where Prob_LA is the probability of staying on the legacy advertising channel. Prob_LA is calculated as N_LA/Win_Scan, where N_LA is the number of times a legacy advertising packet was received during a window of Win_Scan scanning events.

Figure 11:
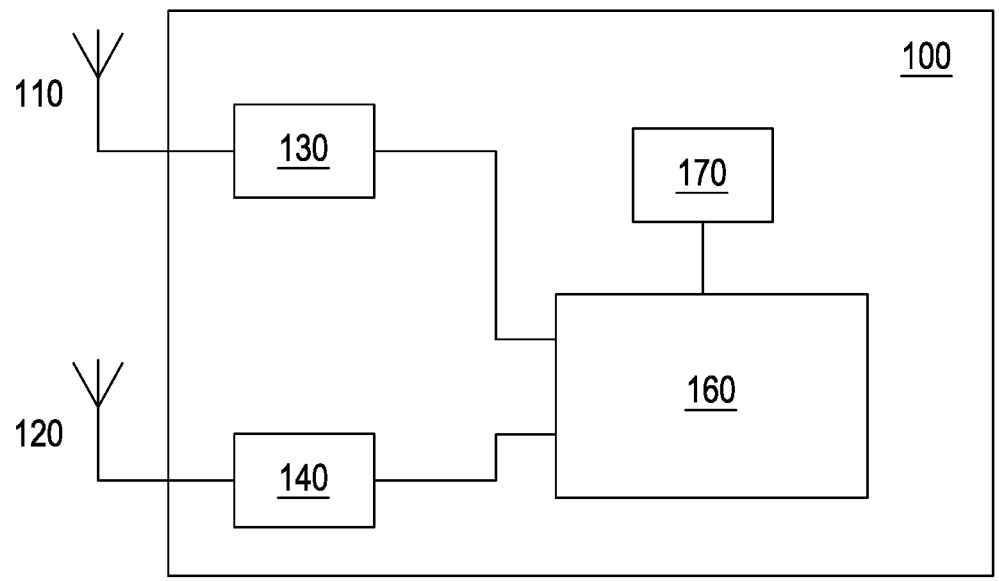
FIG. 11 illustrates a node according to an embodiment.

FIG. 11 shows a node 100 according to an embodiment. The node comprises a transmit 110 and a receive 120 antenna or a combined antenna used for both transmission and reception, a transmit chain 130 and a receive chain 140. The node moreover comprises a controller 160 and non-volatile memory 170. The controller 160 is configured to access computer program instructions stored in the memory 170 and to execute the methods described herein on the basis of these instructions.

The mesh network is made up of a plurality of nodes 100. The plurality of nodes 100 may be source nodes or relay nodes as described above.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

For example, it will be appreciated that the enhancements of the embodiments described herein are not limited to Bluetooth mesh network. They may also be applied to any mesh network based on IEEE 802.15.4 or Wi-Fi technology.

The invention claimed is:

1. A relay node comprising:
controller circuitry configured to scan a first primary advertising channel of primary advertising channels for a duration of a scan window during a scan interval, wherein the primary advertising channels are used to advertise an advertising message in an advertising event;
receiver circuitry configured to receive a first advertising message via the first primary advertising channel; and
transmitter circuitry configured to transmit the first advertising message, wherein the controller circuitry is further configured to:
set a length of the duration in accordance with minimum period required for receiving the advertising message;
increase the length of the duration by values in discrete steps, if the receiver circuitry does not receive any advertising message via the primary advertising channels, wherein the increase, Ts, is given by Ts=Ts+β, wherein β=A+c, wherein A is a constant depending on a size of a protocol data unit and c is a channel switching time and both A and c are fixed;
maintain the length of the duration, if the receiver circuitry receives the advertising message via any one of the primary advertising channels; and
reduce the length of the duration, if the relay node operates in a fast advertising mode.

2. The relay node of claim 1, wherein the controller circuitry is further configured to repeat the increase in the length of the duration until a predetermined maximum duration is reached.

3. The relay node of claim 2, wherein the controller circuitry is further configured to mix a plurality of advertising messages received during a scan of one of the plurality of advertisement events, and the transmitter circuitry is further configured to transmit a linear combination of the plurality of the advertising messages over the primary advertising channels or a different channel.

4. The relay node as claimed in claim 3, wherein the controller circuitry is further configured to decode the linear combination of the plurality of the advertising messages to recover the plurality of the advertising messages.

5. The relay node as claimed in claim 1, wherein the controller circuitry is further configured to decide whether or not to switch to a secondary channel for receiving the advertising message after receiving a pointer to the secondary channel from a source node based on information received on the primary advertising channels and/or based on data to be sent over the secondary channel.

6. The relay node as claimed in claim 5, wherein the controller circuitry is further configured to decide to switch to the secondary channel with a probability only if the data to be sent over the secondary channel is new and/or it is the first advertising event for the source node, or a probability based on the number of times a data packet was received during a window of scanning events.

7. The relay node as claimed in claim 1, wherein the controller circuitry is further configured to adapt a transmit power over each channel transmitting the at least one message from the relay node.

8. The relay node as claimed in claim 7, wherein the controller circuitry is further configured to adapt the transmit power based on the received power from a plurality of neighbouring nodes on all channels and a threshold sensitivity of the receiver.

9. The relay node as claimed in claim 8, wherein the controller circuitry is further configured to find a minimum received power from any of the plurality of neighbouring nodes on each channel, calculate the respective transmit power on each channel based on the minimum received power, and use the respective transmit power on each channel.

10. A method comprising:
scanning a first primary advertising channel of primary advertising channels for a duration of a scan window during a scan interval, wherein the primary advertising channels are used to advertise an advertising message in an advertising event;
receiving a first advertising message via the first primary advertising channel; and
transmitting the first advertising message, wherein the scanning comprises;
setting a length of the duration in accordance with a minimum period required for receiving the advertising message,
increasing the length of the duration by values in discrete steps, if no advertising message is received via the primary advertising channels, wherein the increase, Ts, is given by Ts=Ts+β, wherein β=A+c, wherein A is a constant depending on a size of a protocol data unit and c is a channel switching time and both A and c are fixed;
maintaining the length of the duration, if the advertising message is received via any one of the primary advertising channels; and reducing the length of the duration in a fast advertising mode.

\* \* \* \* \*